United States Patent
Gupta et al.

(10) Patent No.: US 11,074,197 B2
(45) Date of Patent: *Jul. 27, 2021

(54) INTEGRATION OF APPLICATION INDICATED MINIMUM TIME TO CACHE AND MAXIMUM TIME TO CACHE TO LEAST RECENTLY USED TRACK DEMOTING SCHEMES IN A CACHE MANAGEMENT SYSTEM OF A STORAGE CONTROLLER

(71) Applicant: INTERNATIONAL BUSINESS MACHINES CORPORATION, Armonk, NY (US)

(72) Inventors: Lokesh M. Gupta, Tucson, AZ (US); Joseph Hayward, Tucson, AZ (US); Kyler A. Anderson, Sahuarita, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,173

(22) Filed: Jun. 26, 2018

(65) Prior Publication Data

US 2019/0391932 A1 Dec. 26, 2019

(51) Int. Cl.
*G06F 12/00* (2006.01)
*G06F 12/123* (2016.01)

(52) U.S. Cl.
CPC ...... *G06F 12/123* (2013.01); *G06F 2212/462* (2013.01)

(58) Field of Classification Search
None
See application file for complete search history.

(56) References Cited

U.S. PATENT DOCUMENTS

| 5,606,688 A | 2/1997 | McNutt et al. |
| 5,649,156 A | 7/1997 | Vishlitzky et al. |

(Continued)

FOREIGN PATENT DOCUMENTS

AU 2015201273 4/2015

OTHER PUBLICATIONS

Jimenez, DA.; "Insertion and Promotion for Tree-Based PseudoLRU Last-Level Caches"; MICRO-46; Dec. 7, 2013, pp. 13.

(Continued)

*Primary Examiner* — Daniel D Tsui
(74) *Attorney, Agent, or Firm* — Konrad Raynes Davda & Victor LLP; Rabindranath Dutta

(57) ABSTRACT

A computational device receives indications of a minimum retention time and a maximum retention time in cache for a first plurality of tracks, wherein no indications of a minimum retention time or a maximum retention time in the cache are received for a second plurality of tracks. A cache management application demotes a track of the first plurality of tracks from the cache, in response to determining that the track is a least recently used (LRU) track in a LRU list of tracks in the cache and the track has been in the cache for a time that exceeds the minimum retention time. The cache management application demotes the track of the first plurality of tracks, in response to determining that the track has been in the cache for a time that exceeds the maximum retention time.

24 Claims, 10 Drawing Sheets

(56) References Cited

U.S. PATENT DOCUMENTS

| | | | |
|---|---|---|---|
| 6,728,837 | B2 | 4/2004 | Wilkes et al. |
| 6,745,295 | B2 | 6/2004 | Rodriguez |
| 6,842,826 | B1 | 1/2005 | McNutt |
| 8,533,393 | B1 | 9/2013 | Cote et al. |
| 8,838,903 | B2 | 9/2014 | Caulkins |
| 9,158,671 | B2 | 10/2015 | Ryu et al. |
| 9,189,423 | B2 | 11/2015 | Hsu |
| 9,460,025 | B1 | 10/2016 | Wallace et al. |
| 9,734,066 | B1 | 8/2017 | Indupuru et al. |
| 2009/0037660 | A1* | 2/2009 | Fairhurst ............... G06F 12/126 711/129 |
| 2013/0097387 | A1 | 4/2013 | Sanchez Martin et al. |
| 2013/0111146 | A1 | 5/2013 | Ash et al. |
| 2013/0246691 | A1 | 9/2013 | Benhase et al. |
| 2013/0297885 | A1 | 11/2013 | Hyde, II et al. |
| 2014/0181414 | A1 | 6/2014 | Eckert et al. |
| 2014/0330817 | A1* | 11/2014 | Eleftheriou ........... G06F 3/0611 707/722 |
| 2015/0378924 | A1 | 12/2015 | Brandt et al. |
| 2017/0052898 | A1 | 2/2017 | Ash et al. |
| 2017/0060764 | A1 | 3/2017 | Shetty et al. |
| 2017/0124001 | A1 | 5/2017 | Ash et al. |
| 2017/0300426 | A1 | 10/2017 | Chai et al. |
| 2017/0344493 | A1 | 11/2017 | Ash et al. |
| 2018/0081811 | A1 | 3/2018 | Al Sheikh et al. |
| 2019/0391923 | A1 | 12/2019 | Gupta et al. |
| 2019/0391930 | A1 | 12/2019 | Gupta et al. |
| 2019/0391931 | A1 | 12/2019 | Gupta et al. |
| 2019/0391933 | A1 | 12/2019 | Gupta et al. |

OTHER PUBLICATIONS

Paajanen, H.; "Page Replacement in Operating System Memory Management"; Master's Thesis in Information Technology; University of Jyvaskyia; Oct. 23, 2007, pp. 109.

"High Performance Cache with LRU Replacement Policy"; IP.com, http://ip.com/IPCOM/000196714D; Jun. 12, 2010, pp. 20.

Anonymously; "Regioned Least Recently Used Destage Algorithm"; IP.com, http://ip.com/IPCOM/000205106D; Mar. 15, 2011, pp. 3.

Anonymously; "Dynamic Cache Reservation for Virtual Machine Applications in Cloud", IP.com, http://ip.com/IPCOM/000233167D; Nov. 28, 2013, pp. 7.

Hameed, F., et al., "Dynamic cache management in multi-core architectures through run-time adaptation". In Design, Automation & Test in Europe Conference & Exhibition, IEEE, Mar. 2012, pp. 485-490.

Fan, Z., "Improving Storage Performance with Non-Volatile Memory-based Caching Systems" 2017, pp. 117 (Doctoral dissertation, University of Minnesota).

List of IBM Patents or Patent Applications Treated as Related, dated Jun. 26, 2018, pp. 2.

U.S. Appl. No. 16/019,151, filed Jun. 26, 2018.
U.S. Appl. No. 16/019,160, filed Jun. 26, 2018.
U.S. Appl. No. 16/019,163, filed Jun. 26, 2018.
U.S. Appl. No. 16/019,196, filed Jun. 26, 2018.
Response dated Mar. 23, 2020, pp. 10, to Office Action dated Dec. 23, 2019, pp. 24, for U.S. Appl. No. 16/019,163, filed Jun. 26, 2018.
Office Action dated Sep. 6, 2019, pp. 31, for U.S. Appl. No. 16/019,160, filed Jun. 26, 2018.
Response dated Dec. 6, 2019, pp. 11, to Office Action dated Sep. 6, 2019, pp. 31, for U.S. Appl. No. 16/019,160, filed Jun. 26, 2018.
Response dated Apr. 17, 2020, pp. 14, to Office Action dated Jan. 17, 2020, pp. 28, for U.S. Appl. No. 16/019,151.
Notice of Allowance dated Apr. 23, 2020, pp. 13, for U.S. Appl. No. 16/019,196.
Response filed Apr. 23, 2020, pp. 13, to Final Office Action dated Jan. 23, 2020, pp. 26, for U.S. Appl. No. 16/019,160.
Office Action dated Jan. 17, 2020, pp. 28, for U.S. Appl. No. 16/019,151.
Final Office Action dated Jan. 23, 2020, pp. 26, for U.S. Appl. No. 16/019,160, filed Jun. 26, 2018.
Office Action dated Dec. 23, 2019, pp. 24, for U.S. Appl. No. 16/019,163, filed Jun. 26, 2018.
Notice of Allowance dated Jan. 23, 2020, pp. 21, for U.S. Appl. No. 16/019,196.
Notice of Allowance dated May 12, 2020, pp. 21, for U.S. Appl. No. 16/019,163, filed Jun. 26, 2018.
Final Office Action dated Jun. 1, 2020, pp. 42, for U.S. Appl. No. 16/019,151.
Office Action dated Aug. 7, 2020 pp. 24, for U.S. Appl. No. 16/019,160.
Notice of Allowance dated Aug. 5, 2020, pp. 13 for U.S. Appl. No. 16/019,196.
Amendment dated Sep. 1, 2020, pp. 16, to Final Office Action dated Jun. 1, 2020, pp. 42, for U.S. Appl. No. 16/019,151.
Advisory Action dated Aug. 11, 2020, pp. 6, for U.S. Appl. No. 16/019,151.
Response dated Nov. 9, 2020 pp. 15 to Office Action dated Aug. 7, 2020 pp. 24, for U.S. Appl. No. 16/019,160.
Response dated Aug. 3, 2020, pp. 14, to Final Office Action dated Jun. 1, 2020, pp. 42, for U.S. Appl. No. 16/019,151.
Notice of Allowance dated Jul. 23, 2020, pp. 9, for U.S. Appl. No. 16/019,163, filed Jun. 26, 2018.
Notice of Allowance dated Dec. 2, 2020, pp. 34, for U.S. Appl. No. 16/019,160.
U.S. Appl. No. 17/148,217, filed Jan. 13, 2021.
Preliminary Amendment dated Jan. 13, 2021, for U.S. Appl. No. 7/148,250US.
U.S. Appl. No. 17/148,250, filed Jan. 13, 2021.
Preliminary Amendment dated Jan. 13, 2021, for U.S. Appl. No. 17/148,250.
U.S. Appl. No. 17/152,727, filed Jan. 19, 2021.
Preliminary Amendment dated Jan. 19, 2021, for U.S. Appl. No. 17/152,727.
List of IBM Patents or Patent Applications Treated as Related, pp. 2, dated Feb. 11, 2021.
Office Action dated Jan. 29, 2021, pp. 28, for U.S. Appl. No. 16/019,151.

* cited by examiner

| # INTEGRATION OF APPLICATION INDICATED MINIMUM TIME TO CACHE AND MAXIMUM TIME TO CACHE TO LEAST RECENTLY USED TRACK DEMOTING SCHEMES IN A CACHE MANAGEMENT SYSTEM OF A STORAGE CONTROLLER

BACKGROUND

1. Field

Embodiments relate to the integration of application indicated minimum time to cache and maximum time to cache to least recently used track demoting schemes in a cache management system of a storage controller.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

U.S. Pat. No. 6,842,826 at least discusses use of management of LRU algorithm insertion points corresponding to defined times in cache. U.S. Pat. No. 5,606,688 at least discusses dynamic cache memory allocation via single-reference residency times.

US patent application 20170344493 at least discusses use of an access increment number to control a duration during which tracks remain in cache. US patent application 20170052898 at least discuses use of cache lists for processors to determine tracks to demote from a cache. US patent application 20130246691 at least discusses adapting pre-staging in a storage controller. US patent application 20130111146 at least discusses mechanisms for rejecting data provided to a data storage system based on metrics of tentatively evicted data. US patent application 20170060764 at least discusses cache evictions of inactive blocks.

SUMMARY OF THE PREFERRED EMBODIMENTS

Provided are a method, system, and computer program product in which indications are received of a minimum retention time and a maximum retention time in cache for a first plurality of tracks, wherein no indications of a minimum retention time or a maximum retention time in the cache are received for a second plurality of tracks. A cache management application demotes a track of the first plurality of tracks from the cache, in response to determining that the track is a least recently used (LRU) track in a LRU list of tracks in the cache and the track has been in the cache for a time that exceeds the minimum retention time. The cache management application demotes the track of the first plurality of tracks, in response to determining that the track has been in the cache for a time that exceeds the maximum retention time. As a result, both requests for minimum retention time and maximum retention time for tracks are satisfied by the cache management application while performing LRU based replacement of tracks.

In additional embodiments, the cache management application demotes a track of the second plurality of tracks from the cache, in response to determining that the track of the second plurality of tracks is a least recently used (LRU) track in the LRU list. As a result tracks that do not have a minimum or maximum retention time specified continue to be demoted in accordance with LRU based replacement of tracks.

In further embodiments, the minimum retention time is indicative of a preference of the host application to maintain the first plurality of tracks in the cache for at least the minimum retention time, wherein the maximum retention time is indicative of a preference of the host application to maintain the first plurality of tracks in the cache for no more than the maximum retention time. As a result, a storage controller is provided with information on minimum and maximum retention time for tracks by a host application.

In certain embodiments, the cache management application performs a least recently used (LRU) based replacement of tracks in the cache, wherein the cache management application performs an attempt to satisfy the preference of the host application to maintain the first plurality of tracks in the cache for at least the minimum retention time while performing the LRU based replacement of tracks in the cache. As a result, minimum retention time for tracks are satisfied to the extent possible.

In further embodiments, the cache management application retains the first plurality of tracks in the cache for no more than the maximum retention time while performing the LRU based replacement of tracks in the cache. As a result, maximum retention time for tracks are satisfied with performing LRU based replacement of tracks.

In certain embodiments, the track of the first plurality of tracks is demoted from the cache even if the track has not been in the cache for a time that exceeds the minimum retention time, in response to determining that there are too many tracks that have not been in the cache for the minimum retention time or that too few tracks of the first plurality of tracks are eligible for demotion from the cache, wherein a quantitative measure of the too many tracks or the too few tracks are provided by values of predetermined parameters. In such embodiments, the storage controller allocates the cache equitably to applications by not allowing minimum retention time tracks of certain applications to become too many in number and as a result not allow other applications to store tracks in the cache.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A cache replacement policy in a storage controller may be LRU based. In a conventional LRU based mechanism, a track upon being accessed is added to a most recently used (MRU) end of a LRU list. As the track ages (i.e., is not used) the track moves to the LRU end of the LRU list and then gets demoted (i.e., discarded or removed) from the cache.

In certain embodiments, an application may provide indications to a storage controller to store tracks used by the application for a minimum period of time in the cache, where the minimum period of time is referred to as a minimum retention time. The application is likely to reaccess (i.e., access once again) the track within the minimum retention time, so it is desirable not to demote the track from the cache until the expiry of the minimum retention time.

In certain embodiments, an application may provide indications to a storage controller to store tracks used by the application for a maximum period of time in the cache, where the maximum period of time is referred to as a maximum retention time. The application is unlikely to reaccess (i.e., access once again) the track after the maximum retention time, so it is desirable to demote the track from the cache after the expiry of the maximum retention time to free up space in the cache. The indications provided by the application may be regarded as hints provided to a cache management application for improving the efficiency of cache replacement policies.

If the minimum and maximum retention times are not specified by the application then the cache management application uses the conventional LRU based mechanism to age out the track. If a plurality of applications indicate different minimum and maximum retention times then it is desirable for the cache management application to incorporate the different minimum and maximum retention times with the conventional LRU based mechanisms.

Certain embodiments provide improvements to computer technology by performing caching using application hints of both a minimum and a maximum time to cache. A host application provides hints to a storage controller on the minimum time the tracks of the application should remain in the cache, and the maximum time the tracks of the application should remain in the cache. The existing cache management application that uses a LRU list is modified to accommodate the above two application hints. As a result, caching operations in a storage controller takes account of hints (i.e., indications) provided by an application to retain certain tracks in cache at least for a minimum amount of time, and not to retain certain tracks in cache beyond a maximum amount of time while performing LRU based replacement of tracks.

Exemplary Embodiments

Figure 1:
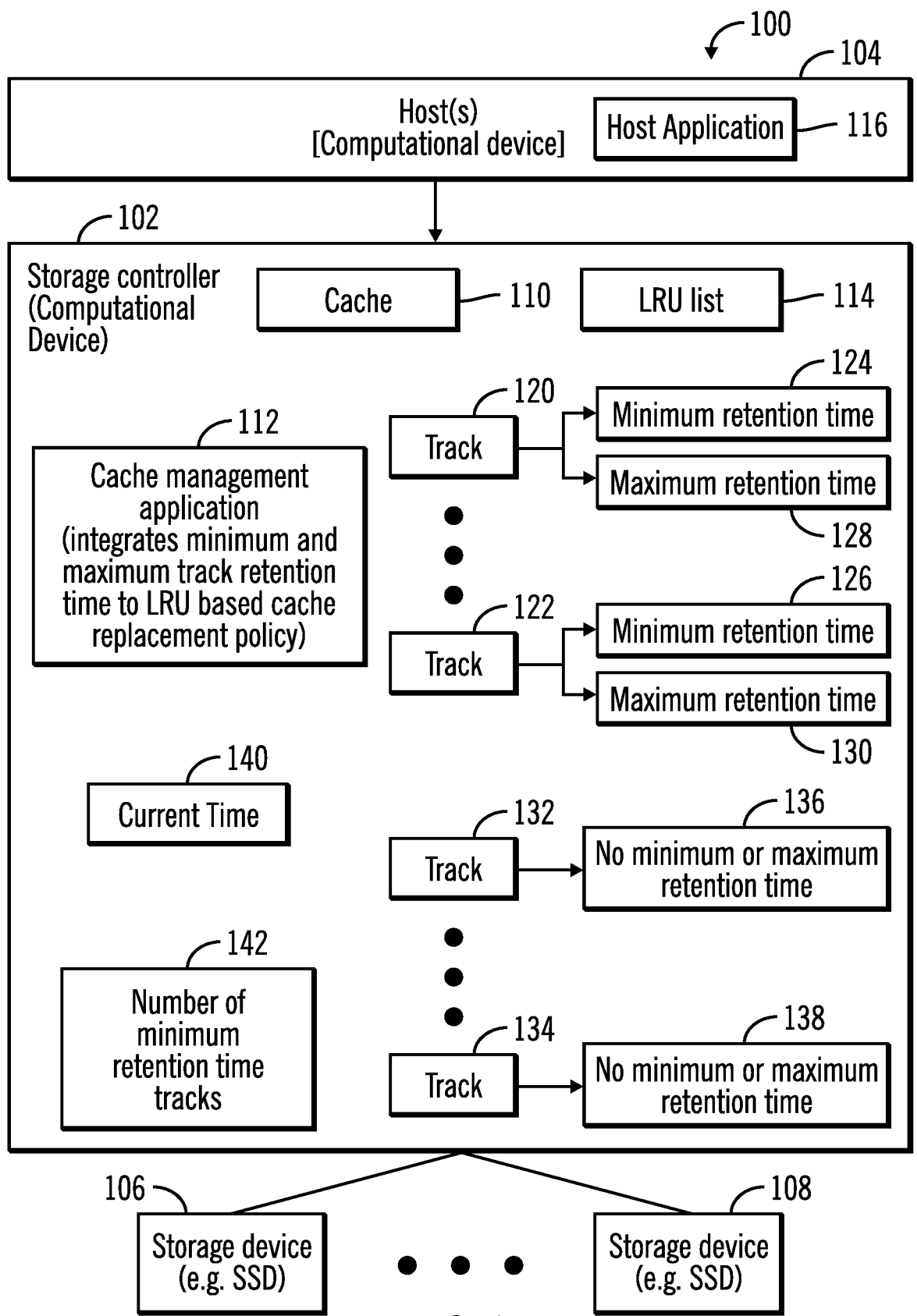
FIG. 1 illustrates a block diagram of a computing environment comprising a storage controller coupled to one or more hosts and one or more storage devices, in accordance with certain embodiments.

FIG. 1 illustrates a block diagram of a computing environment 100 comprising a storage controller 102 coupled to one or more hosts 104 and one or more storage devices 106, 108, in accordance with certain embodiments.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache 110 of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed.

Each of the plurality of servers may be referred to as a processing complex and may include one or more processors and/or processor cores.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The cache 110 may be any suitable cache known in the art or developed in the future. In some embodiments, the cache 110 may be implemented with a volatile memory and/or non-volatile memory. The cache 110 may store both modified and unmodified data, where a cache management application 112 may periodically demote (i.e., move) data from the cache 110 to storage devices 106, 108 controlled by the storage controller 102. In certain embodiments, cache management application 112 may be implemented in software, firmware, hardware or any combination thereof. The cache management application 112 integrates minimum and maximum track retention time while to LRU based cache replacement policies.

The plurality of storage devices 106, 108 may be comprised of any storage devices known in the art. For example, the storage device 106 may be a solid state drive (SSD) and the storage device 108 may be a hard disk drive (HDD).

A LRU list 114 is maintained in the storage controller 102 by the cache management application 112. The cache management application 112 receives indications from one or more host applications on whether tracks used by the host application 116 should be demoted from the cache 110 after a time duration referred to as a maximum retention time if the track is not accessed within the maximum retention time. The host application 116 may also indicate minimum retention time for tracks to the cache management application 112. A plurality of tracks 120, 122 may have minimum retention times 124, 126 and maximum retention times 128, 130 indicated by host applications. Another plurality of tracks 132, 134 may have no indications of minimum or maximum retention time (as shown via reference numerals 136, 138). The LRU list 114 may include some of the plurality of tracks 120, 122 and some of the plurality of tracks 132, 134, i.e., the LRU list 114 includes tracks in the cache 110 with maximum and minimum retention times and tracks in the cache 110 without maximum or minimum retention times. It should be noted that each track stored in the cache 110 is indicated in the LRU list 114, and the LRU list 114 is used by the cache management application 112 to determine which tracks to demote from the cache 110.

The storage controller 102 also includes an indicator, such as a clock, that provides the current time 140 of the storage controller 102, where the current time 140 and a timestamp associated with a track when the track is staged to the cache 110 are used to determine the amount of time the track has been stored in the cache 110.

In certain embodiments, the cache management application 112 demotes tracks from the cache 110 by taking into account the LRU list 114 which is augmented with the minimum retention time and maximum retention time for tracks where such minimum and maximum retention times are available. An attempt is made by the cache management application 112 to satisfy the minimum and maximum retention time requirements to the extent possible, while at the same time preventing the cache 110 from becoming full. To determine whether the cache 110 is becoming full, the cache management application 112 keeps track of the number of minimum retention time tracks 142.

Figure 2:
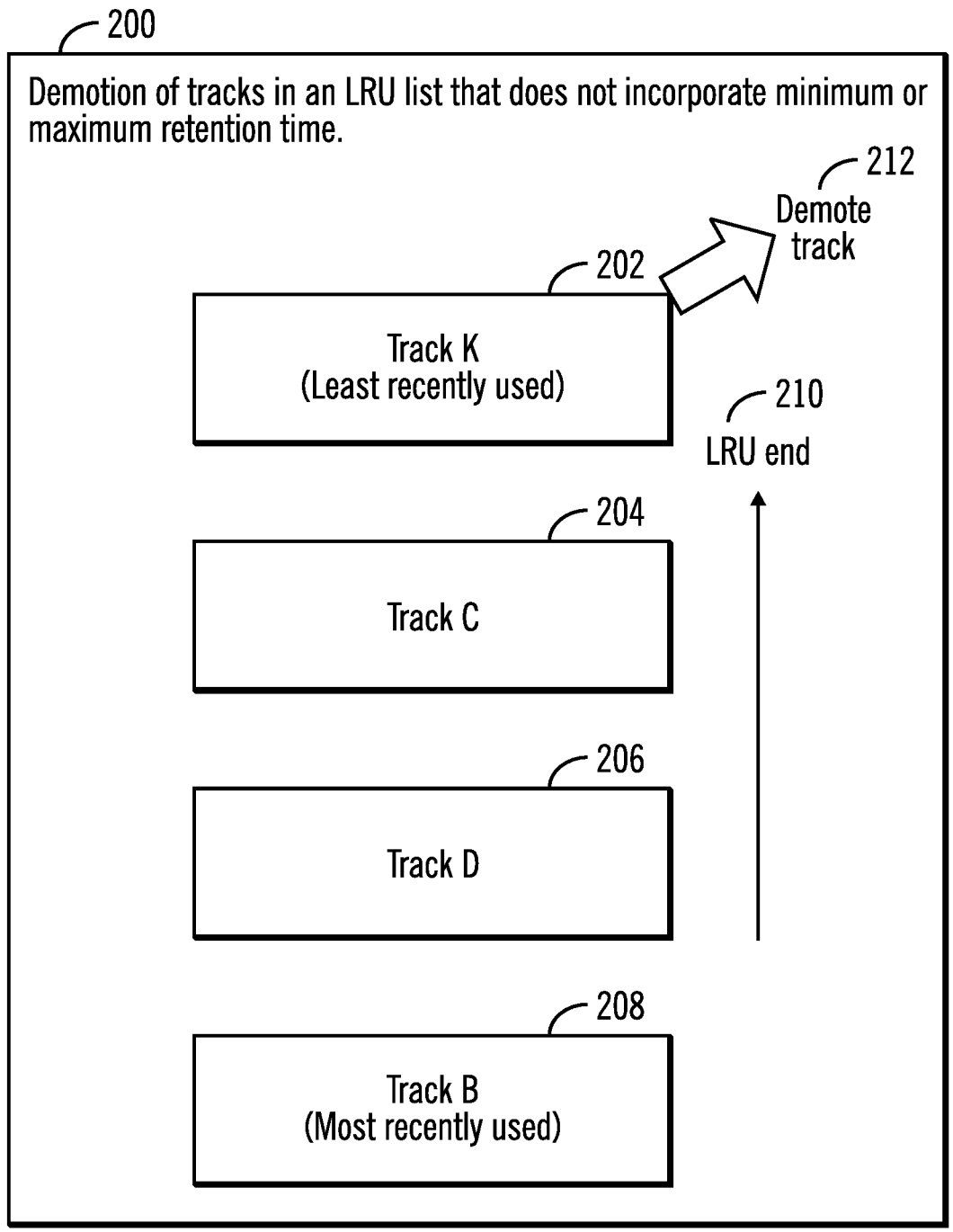
FIG. 2 illustrates a block diagram that shows demotion of tracks from a LRU list that does not incorporate minimum or maximum retention time for selected tracks, in accordance with certain embodiments.

FIG. 2 illustrates a block diagram 200 that shows demotion of tracks from a LRU list that does not incorporate a minimum or maximum retention time for selected tracks, in accordance with certain embodiments.

For simplicity, only four tracks, denoted as track K 202, track C 204, track D 206, and track B 208 are shown in FIG. 2, although a typical LRU list may have thousands or tens of thousands of tracks.

The LRU end of the list is towards the top (as shown via reference numeral 210). As a result, track K 202 is the least recently used track, and track B 208 is the most recently used track. Track K 202 which is the least recently used track is demoted first in a conventional LRU based cache replacement policy (as shown via reference numeral 212).

Figure 3:
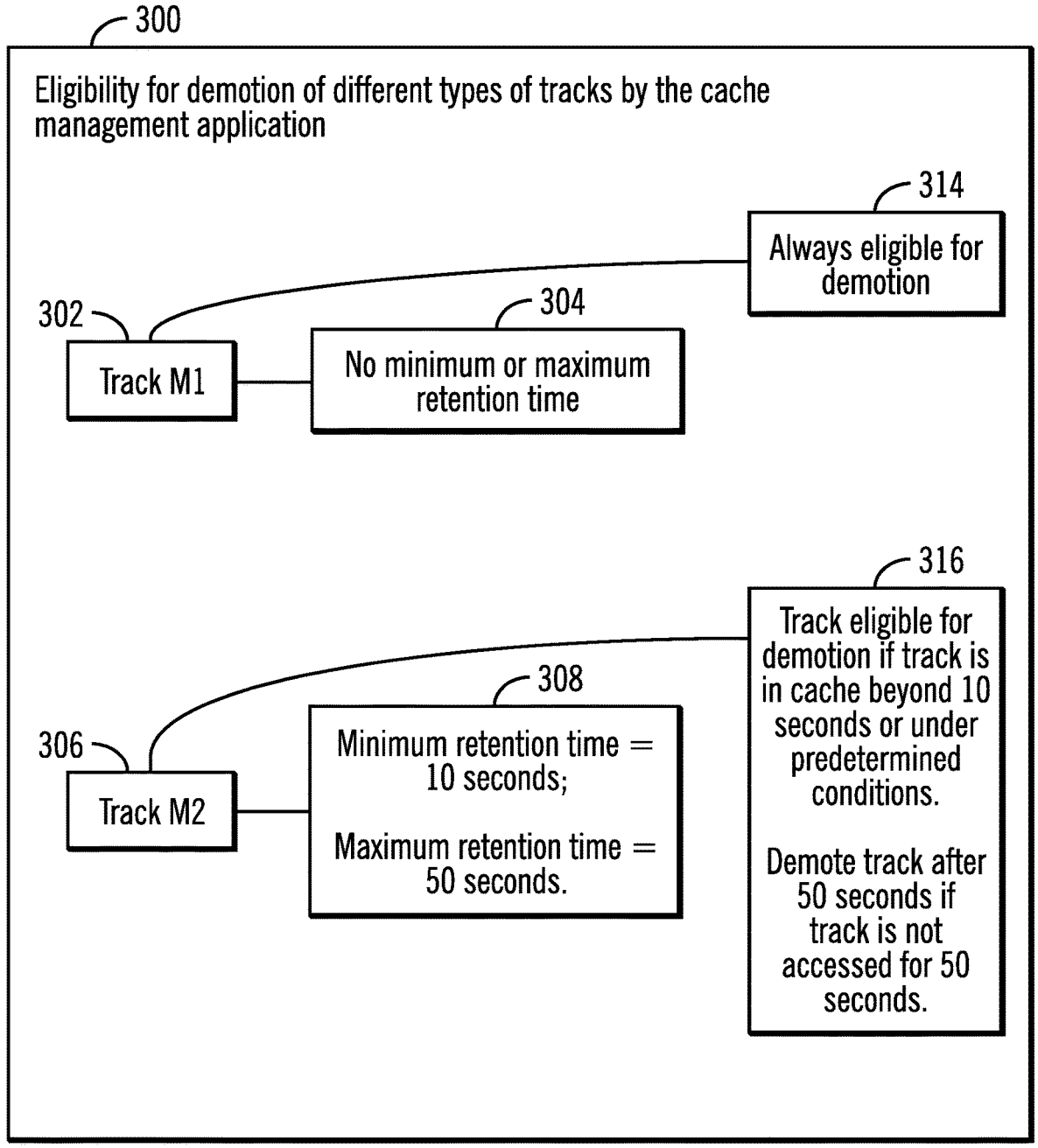
FIG. 3 illustrates a block diagram that shows the eligibility for demotion of different types of tracks, in accordance with certain embodiments.

FIG. 3 illustrates a block diagram 300 that shows the eligibility for demotion of different types of tracks in a cache 110, in accordance with certain embodiments.

Track M1 302 has no minimum or maximum retention time 304 indicated by the host application 116. As a result track M1 302 is always eligible for demotion when track M1 302 reaches the LRU end of the LRU list 114 (as shown via reference numeral 314).

Track M2 306 has a minimum retention time of 10 seconds and a maximum retention time of 50 seconds indicated by the host application 116 (as shown via reference numeral 308). As a result of the minimum retention time of 10 seconds, track M2 306 is eligible for demotion from the cache if the track is in cache beyond 10 seconds or under certain predetermined conditions (as shown via reference numeral 316). As a result of the maximum retention time of 50 seconds, track M2 306 is demoted from the cache if the track is not accessed in cache for at least 50 seconds (as shown via reference numeral 316).

Figure 4:
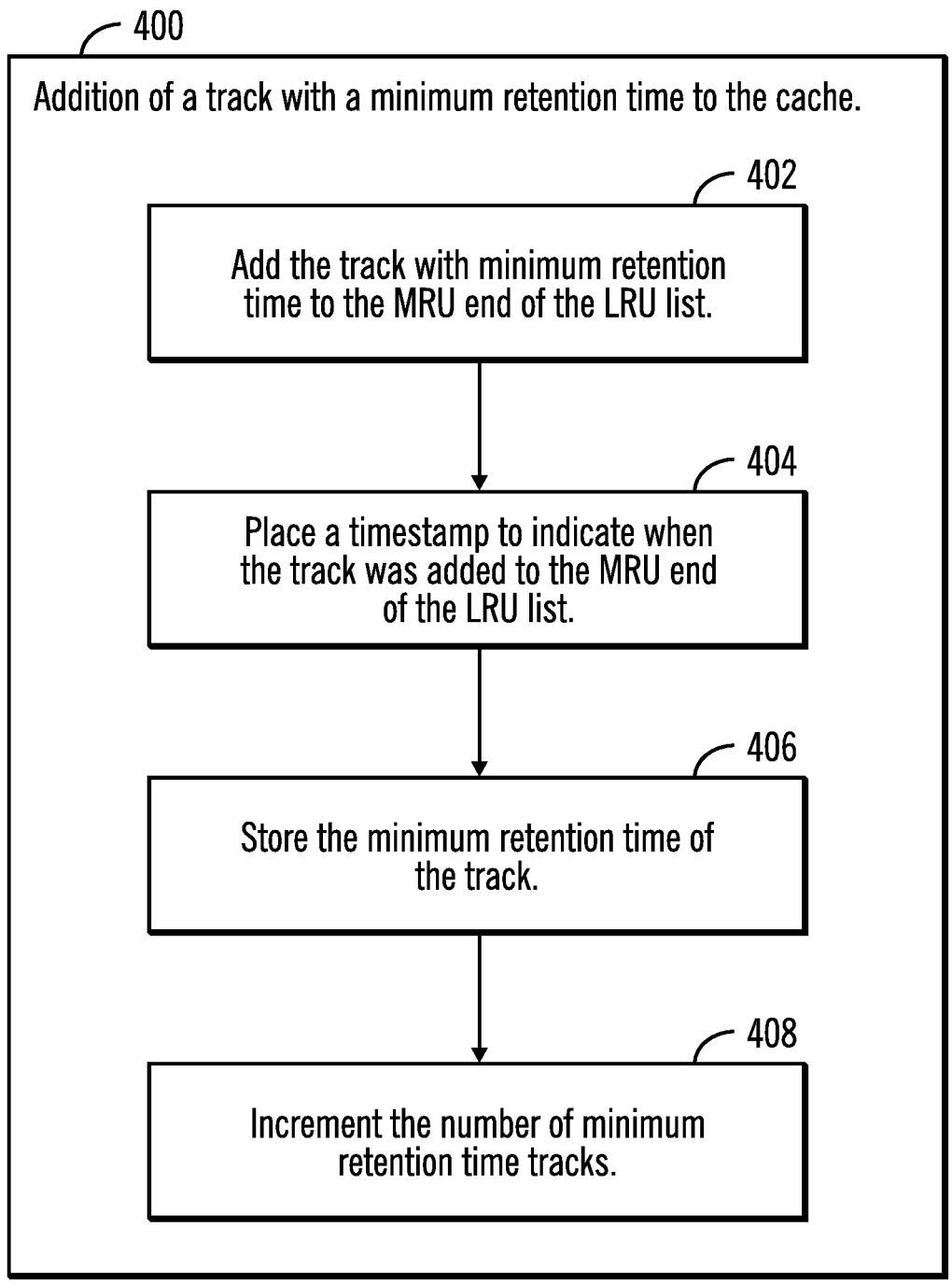
FIG. 4 illustrates a flowchart that shows the addition of a track with a minimum retention time to the cache, in accordance with certain embodiments.

FIG. 4 illustrates a flowchart 400 that shows the addition of a track with a minimum retention time to the cache 110, in accordance with certain embodiments. The track may or may not have a maximum retention time associated with the track. The operations shown in FIG. 4 may be performed by the cache management application 112 that executes in the storage controller 102. The operations shown in FIG. 4 improves the performance of the storage controller 102 by preventing potential cache misses should there be indications of minimum retention time for certain tracks in the cache 110.

Control starts at block 402 in which the cache management application 112 adds the track with minimum retention time to the MRU end of the LRU list 114. Control proceeds to block 404 in which the cache management application 112 places a timestamp to indicate when the track was added to the MRU end of the LRU list 114. The timestamp is kept in association with the track that is added to the LRU list 114

From block 404 control proceeds to block 406 in which the cache management application 112 stores the minimum retention time of the track in association with the track that is added to the LRU list 114. The cache management application 112 then increments (i.e., adds the number 1) to the number of minimum retention time tracks 142 (as shown via block 408).

Therefore, FIG. 4 shows certain embodiments in which tracks are added to the LRU list 114 with indication of the minimum retention time and a timestamp that records the time at which the track was added to the LRU list. The number of tracks with minimum retention time is updated when a track with a minimum retention time is added to the LRU list 114. It should be noted that the LRU list 114 is updated each time a track is added to the cache 110. The maximum retention time for tracks are also maintained in association with the tracks.

Figure 5:
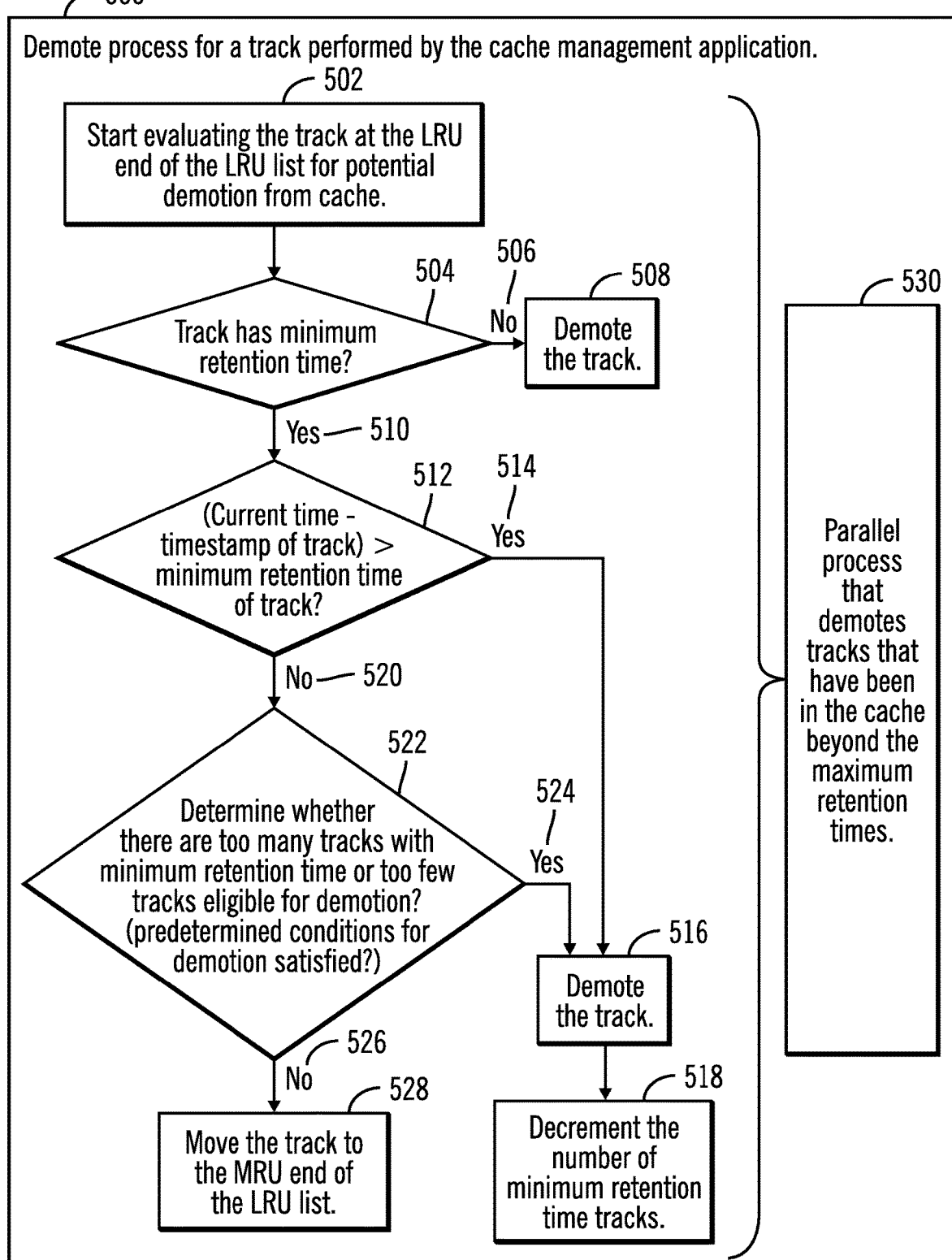
FIG. 5 illustrates a flowchart that shows the demote process for a track as performed by a cache management application, in accordance with certain embodiments.

FIG. 5 illustrates a flowchart 500 that shows the demote process for a track as performed ty a cache management application 112, in accordance with certain embodiment. The operations shown in FIG. 5 improves the performance of the storage controller 102 by reducing cache misses should there be indications of minimum retention time. The operations also incorporate maximum retention time for certain tracks in the cache 110.

Control starts at block 502 in which the cache management application 112 starts evaluating the track at the LRU end of the LRU list 114 for potential demotion from the cache 110. Control proceeds to block 504 in which the cache management application 112 determines whether the track has a minimum retention time. If not ("No" branch 506), then the cache management application 112 demotes (at block 508) the track from the cache 110.

If at block 504 the cache management application 112 determines that the track has a minimum retention time ("Yes" branch 510) then control proceeds to block 512 in which the cache management application 112 determines whether the difference of the current time 140 from the timestamp of the track is greater than the minimum retention time of the track (i.e., whether the track has been in the cache for a time that exceeds the minimum retention time). If so ("Yes" branch 514) then the track is demoted (at block 516) and the cache management application 112 decrements (i.e., subtracts the number 1) the number of minimum retention time tracks 142 in the cache 110 (at block 518).

If at block 512 it is determined that the difference of the current time 140 from the timestamp of the track is not greater than the minimum retention time of the track (i.e., the track has not been in the cache for a time that exceeds the minimum retention time) ["No" branch 520] control proceeds to block 522 to determine whether the track should be demoted to prevent the cache 110 from becoming full.

At block 522 the cache management application 112 determines whether there are too many tracks with minimum retention time or too few tracks that are eligible for demotion from the cache that may cause the cache to become full. What is "too many" and what is "too few" is determined based on certain predetermined conditions, where some exemplary predetermined conditions are described later in FIG. 6.

If at block 522 the cache management application 112 determines that there are too many tracks with minimum retention time or too few tracks that are eligible for demotion from the cache that may cause the cache to become full ("Yes" branch 524) then control proceeds to block 516 in which the track is demoted and the number of minimum retention time tracks is decremented (at block 518).

If at block 522 the cache management application 112 determines that that neither are there too many tracks with minimum retention time nor are there too few tracks that are eligible for demotion from the cache that may cause the cache to become full ("No" branch 526) then there is no danger of the cache 110 becoming full and the cache management application 112 moves (at block 528) the track to the MRU end of the LRU list 114 (i.e., the track is retained in the cache 110 and moved to the MRU end of the LRU list 114).

Additionally, in parallel to the operations shown via reference numerals 512-528, the cache management application 112 executes a parallel process that demotes each track that has been in the cache beyond the maximum retention time for the track without being accessed (as shown via reference numeral 530). Various mechanisms such as a partitioning of the LRU list 114 and demotion of groups of tracks in certain partitions of the LRU list 114 may be employed for demotion of tracks that exceed the maximum retention time without being accessed.

Therefore, FIG. 5 illustrates certain embodiments in which tracks that are indicated as having a minimum retention time are preferred for storing in the cache at least till the expiry of the minimum retention time unless the cache 110 is in danger of becoming full. Additionally, tracks that have been in the cache beyond the maximum retention time without being accessed are also demoted.

Figure 6:
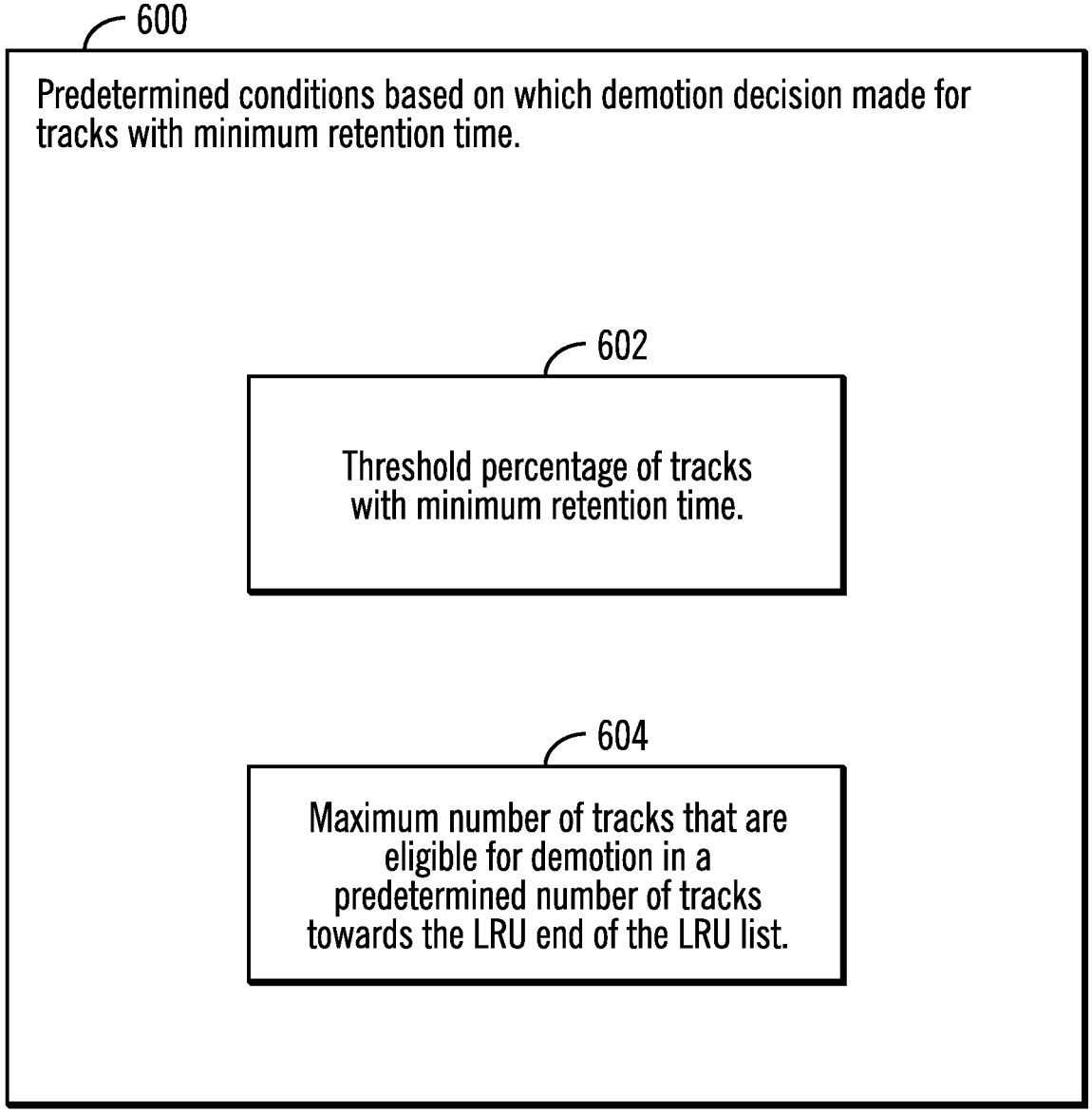
FIG. 6 illustrates a block diagram that shows predetermined conditions based on which a demotion decision for a track with minimum retention time is made, in accordance with certain embodiments.

FIG. 6 illustrates a block diagram 600 that shows predetermined conditions based on which a demotion decision for a track with minimum retention time is made, in accordance with certain embodiments.

A threshold indicating the percentage of tracks with minimum retention time above which tracks with minimum retention time are eligible for demotion is maintained (as shown via reference numeral 602) in the storage controller 102. For example in certain embodiments the threshold may be 50%, and as a result more if more than 50% of the tracks in the cache are tracks with minimum retention time, then one or more tracks with minimum retention time may be demoted based on the determination in block 522 of FIG. 5.

A "maximum number" of tracks that are eligible for demotion in a "predetermined number" of tracks towards the LRU end of the LRU list 114 is maintained (as shown via reference numeral 604) in the storage controller 102. For example, if the cache management application 112 scans N tracks from the bottom of the LRU (i.e., the N least recently used tracks, where N is a number) and finds less than M tracks eligible to demote because of minimum retention time requirements, then tracks with a minimum retention time may be demoted (i.e., M is the maximum number and N is the "predetermined number"). For example, if the cache management application 112 scans 1000 tracks from the bottom of LRU (i.e., the 1000 least recently used tracks) to demote and only finds less than 100 as being eligible for demotion then tracks with minimum retention time may be demoted based on the determination in block 522 of FIG. 5.

Figure 7:
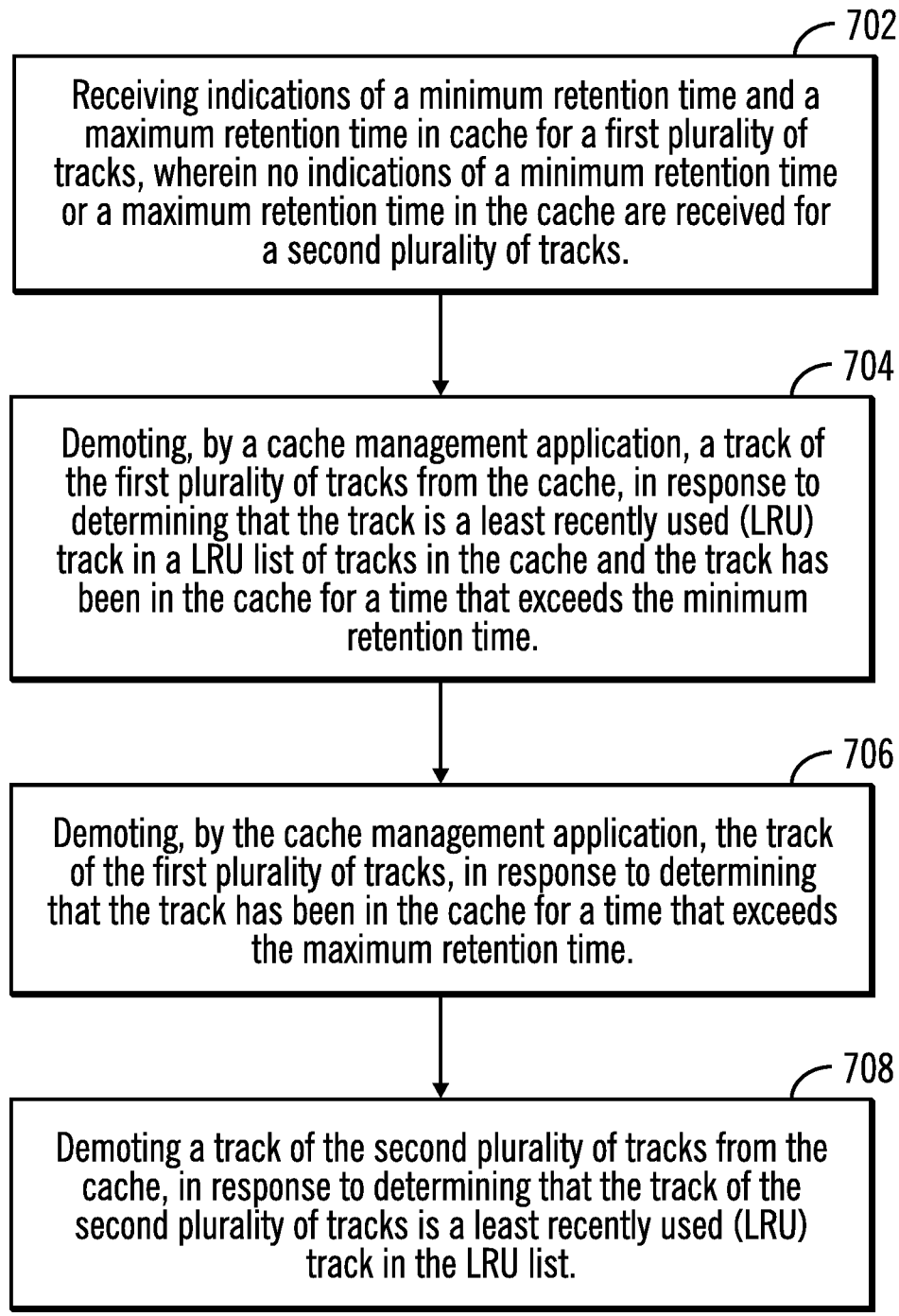
FIG. 7 illustrates a flowchart that shows how minimum and maximum retention time of tracks are integrated with least recently used (LRU) based cache replacement policies, in accordance with certain embodiments.

FIG. 7 illustrates a flowchart that shows how minimum and maximum retention time of tracks are integrated with least recently used (LRU) based cache replacement policies, in accordance with certain embodiments. The operations shown in FIG. 7 may be performed by the cache management application 112 that executes in the storage controller 102.

Control starts at block 702 in which indications are received of a minimum retention time and a maximum retention time in cache for a first plurality of tracks, wherein no indications of a minimum retention time or a maximum retention time in the cache are received for a second plurality of tracks.

A cache management application 112 demotes (at block 704) a track of the first plurality of tracks from the cache, in response to determining that the track is a least recently used (LRU) track in a LRU list of tracks in the cache and the track has been in the cache for a time that exceeds the minimum retention time. The cache management application 112 demotes the track of the first plurality of tracks, in response to determining that the track has been in the cache for a time that exceeds the maximum retention time (at block 706). As a result, both requests for minimum retention time and maximum retention time for tracks are satisfied by the cache management application while performing LRU based replacement of tracks.

From block 706 control proceeds to block 708 in which in additional embodiments, the cache management application 112 demotes a track of the second plurality of tracks from the cache, in response to determining that the track of the second plurality of tracks is a least recently used (LRU) track in the LRU list. As a result tracks that do not have a minimum or maximum retention time continue to be demoted in accordance with LRU based replacement of tracks.

Therefore, FIG. 1-7 illustrate certain embodiments to incorporate minimum and maximum retention time hints with conventional LRU based cache replacement mechanisms.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
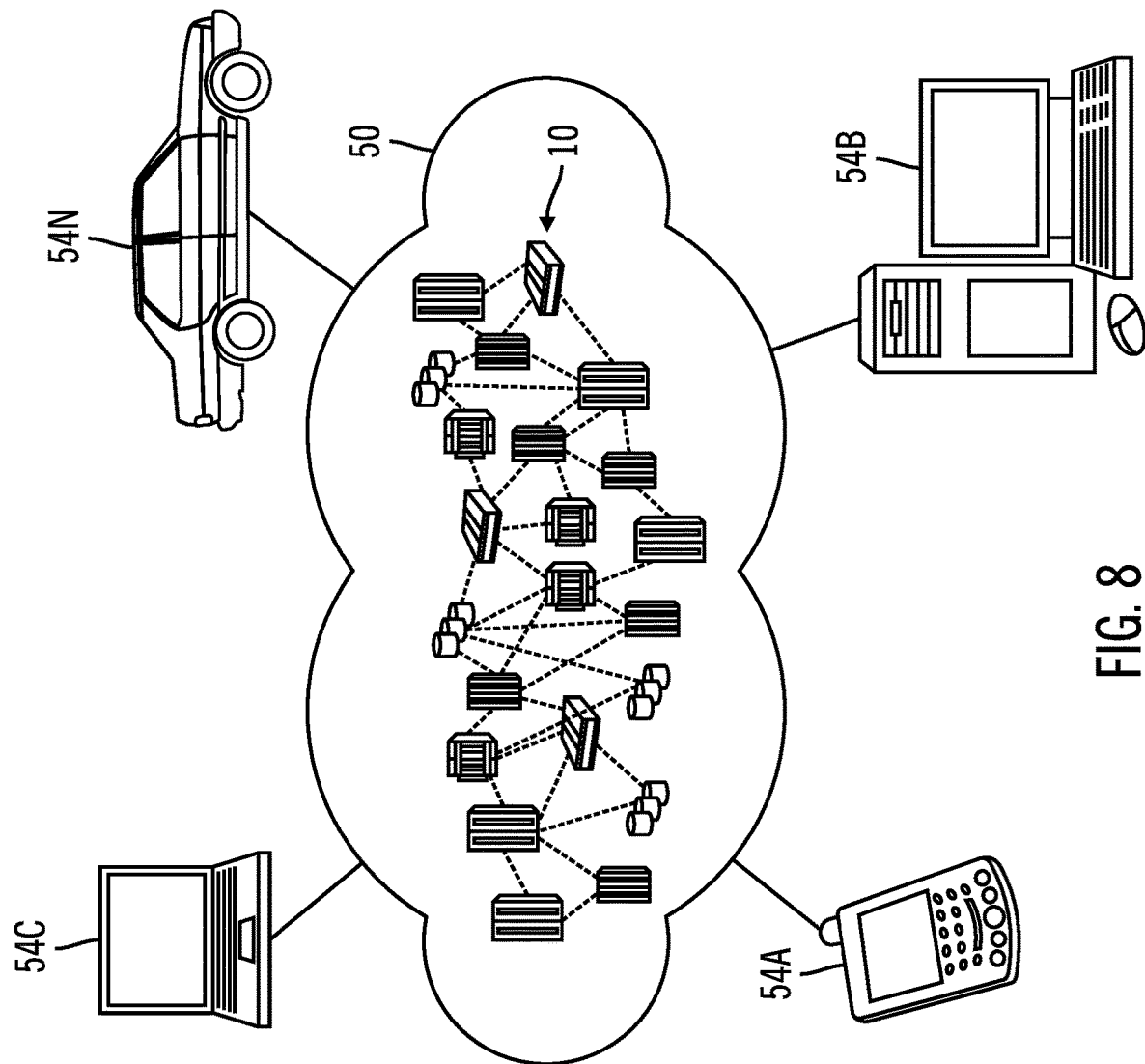
FIG. 8 illustrates a block diagram of a cloud computing environment, in accordance with certain embodiments.

Referring now to FIG. 8 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
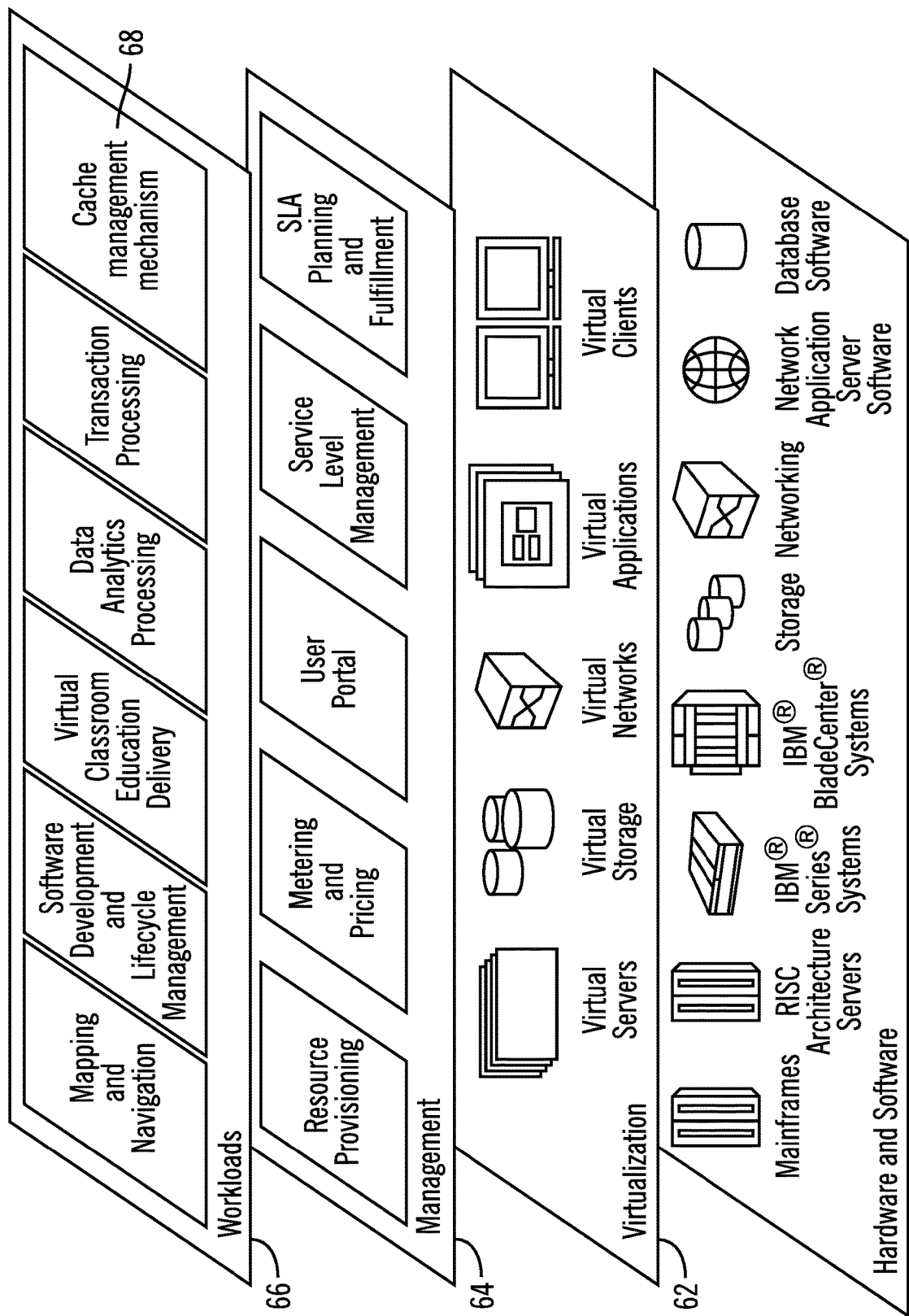
FIG. 9 illustrates a block diagram of further details of the cloud computing environment of FIG. 8, in accordance with certain embodiments.

Referring now to FIG. 9, a set of functional abstraction layers provided by cloud computing environment 50 of FIG. 8 is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cache management mechanism 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
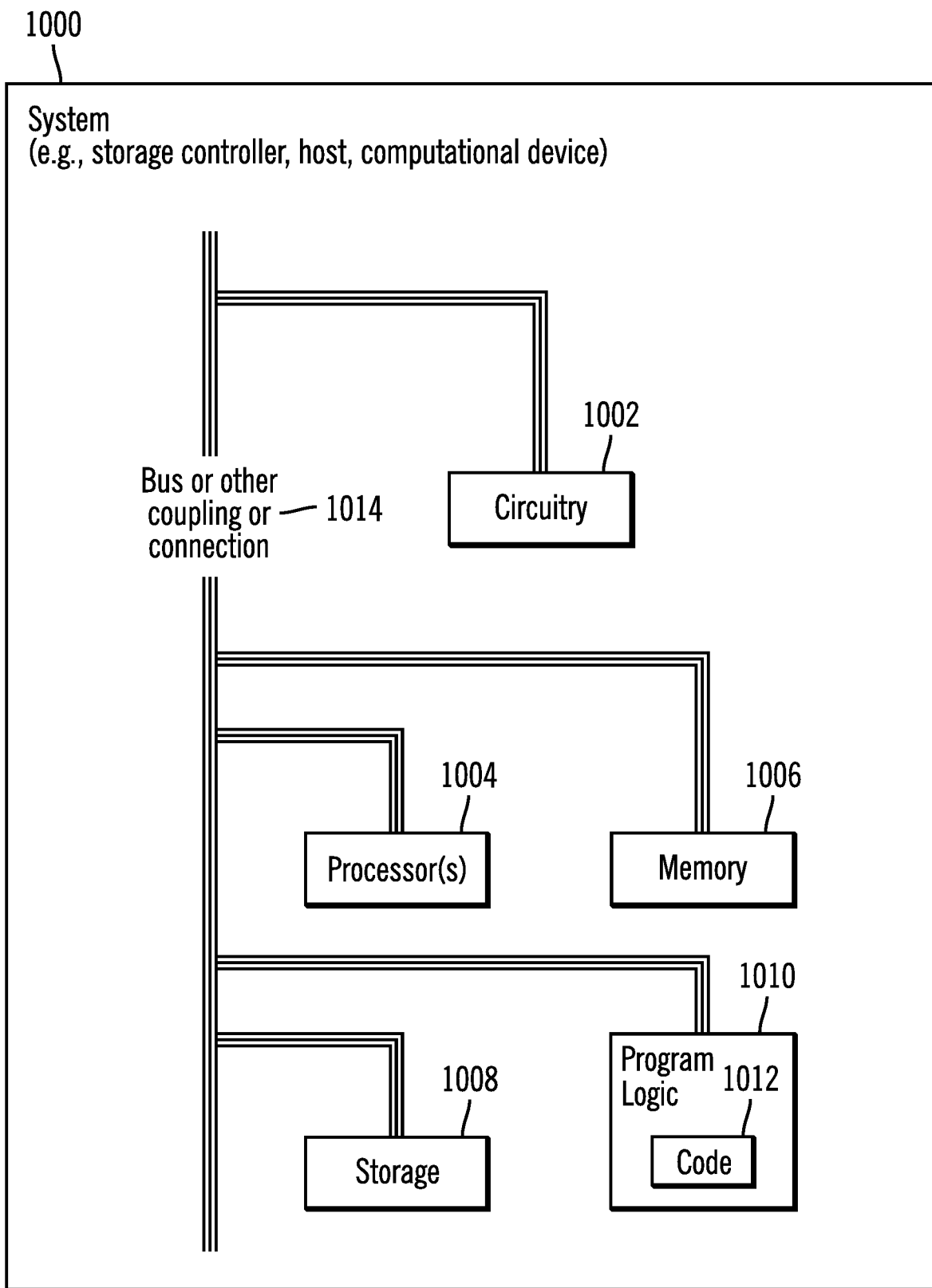
FIG. 10 illustrates a block diagram of a computational system that shows certain elements that may be included in the storage controller or the host, as described in FIGS. 1-9, in accordance with certain embodiments.

FIG. 10 illustrates a block diagram that shows certain elements that may be included in the storage controller 102 or the host 104, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving indications of a minimum retention time and a maximum retention time in a cache for a first plurality of tracks, wherein no indications of the minimum retention time or the maximum retention time in the cache are received for a second plurality of tracks; and
demoting, by a cache management application, a track of the first plurality of tracks from the cache even if the track has not been in the cache for a time that exceeds the minimum retention time, in response to determining that there are too many tracks that have not been in the cache for the minimum retention time or that too few tracks of the first plurality of tracks are eligible for demotion from the cache, wherein a quantitative measure of the too many tracks or the too few tracks are provided by values of predetermined parameters.

2. The method of claim 1, the method further comprising:
demoting a track of the second plurality of tracks from the cache, in response to determining that the track of the second plurality of tracks is a least recently used (LRU) track in the LRU list.

3. The method of claim 1, wherein the minimum retention time is indicative of a preference of a host application to maintain the first plurality of tracks in the cache for at least the minimum retention time, and wherein the maximum retention time is indicative of a preference of the host application to maintain the first plurality of tracks in the cache for no more than the maximum retention time.

4. The method of claim 3, wherein the cache management application performs a least recently used (LRU) based replacement of tracks in the cache, and wherein the cache management application performs an attempt to satisfy the preference of the host application to maintain the first plurality of tracks in the cache for at least the minimum retention time while performing the LRU based replacement of tracks in the cache.

5. The method of claim 4, wherein the cache management application retains the first plurality of tracks in the cache for no more than the maximum retention time while performing the LRU based replacement of tracks in the cache.

6. The method of claim 1, the method further comprising:
demoting, by the cache management application, the track of the first plurality of tracks from the cache, in response to determining that the track is a least recently used (LRU) track in a LRU list of tracks in the cache and the track has been in the cache for a time that exceeds the minimum retention time; and
demoting, by the cache management application, the track of the first plurality of tracks, in response to determining that the track has been in the cache for a time that exceeds the maximum retention time.

7. A system, comprising:
a memory; and
a processor coupled to the memory, wherein the processor performs operations, the operations performed by the processor comprising:
receiving indications of a minimum retention time and a maximum retention time in a cache for a first plurality of tracks, wherein no indications of the minimum retention time or the maximum retention time in the cache are received for a second plurality of tracks; and demoting, by a cache management application, a track of the first plurality of tracks from the cache even if the track has not been in the cache for a time that exceeds the minimum retention time, in response to determining that there are too many tracks that have not been in the cache for the minimum retention time or that too few tracks of the first plurality of tracks are eligible for demotion from the cache, wherein a quantitative measure of the too many tracks or the too few tracks are provided by values of predetermined parameters.

8. The system of claim 7, the operations further comprising:

demoting a track of the second plurality of tracks from the cache, in response to determining that the track of the second plurality of tracks is a least recently used (LRU) track in the LRU list.

9. The system of claim 7, wherein the minimum retention time is indicative of a preference of a host application to maintain the first plurality of tracks in the cache for at least the minimum retention time, and wherein the maximum retention time is indicative of a preference of the host application to maintain the first plurality of tracks in the cache for no more than the maximum retention time.

10. The system of claim 9, wherein the cache management application performs a least recently used (LRU) based replacement of tracks in the cache, and wherein the cache management application performs an attempt to satisfy the preference of the host application to maintain the first plurality of tracks in the cache for at least the minimum retention time while performing the LRU based replacement of tracks in the cache.

11. The system of claim 10, wherein the cache management application retains the first plurality of tracks in the cache for no more than the maximum retention time while performing the LRU based replacement of tracks in the cache.

12. The system of claim 7, the operations further comprising:

demoting, by the cache management application, the track of the first plurality of tracks from the cache, in response to determining that the track is a least recently used (LRU) track in a LRU list of tracks in the cache and the track has been in the cache for a time that exceeds the minimum retention time; and demoting, by the cache management application, the track of the first plurality of tracks, in response to determining that the track has been in the cache for a time that exceeds the maximum retention time.

13. A computer program product, the computer program product comprising a computer readable storage medium having computer readable program code embodied therewith, the computer readable program code configured to perform operations in a computational device, the operations comprising:

receiving indications of a minimum retention time and a maximum retention time in a cache for a first plurality of tracks, wherein no indications of the minimum retention time or the maximum retention time in the cache are received for a second plurality of tracks; and demoting, by a cache management application, a track of the first plurality of tracks from the cache even if the track has not been in the cache for a time that exceeds the minimum retention time, in response to determining that there are too many tracks that have not been in the cache for the minimum retention time or that too few tracks of the first plurality of tracks are eligible for demotion from the cache, wherein a quantitative measure of the too many tracks or the too few tracks are provided by values of predetermined parameters.

14. The computer program product of claim 13, the operations further comprising:

demoting a track of the second plurality of tracks from the cache, in response to determining that the track of the second plurality of tracks is a least recently used (LRU) track in the LRU list.

15. The computer program product of claim 13, wherein the minimum retention time is indicative of a preference of a host application to maintain the first plurality of tracks in the cache for at least the minimum retention time, and wherein the maximum retention time is indicative of a preference of the host application to maintain the first plurality of tracks in the cache for no more than the maximum retention time.

16. The computer program product of claim 15, wherein the cache management application performs a least recently used (LRU) based replacement of tracks in the cache, and wherein the cache management application performs an attempt to satisfy the preference of the host application to maintain the first plurality of tracks in the cache for at least the minimum retention time while performing the LRU based replacement of tracks in the cache.

17. The computer program product of claim 16, wherein the cache management application retains the first plurality of tracks in the cache for no more than the maximum retention time while performing the LRU based replacement of tracks in the cache.

18. The computer program product of claim 13, the operations further comprising:

demoting, by the cache management application, the track of the first plurality of tracks from the cache, in response to determining that the track is a least recently used (LRU) track in a LRU list of tracks in the cache and the track has been in the cache for a time that exceeds the minimum retention time; and demoting, by the cache management application, the track of the first plurality of tracks, in response to determining that the track has been in the cache for a time that exceeds the maximum retention time.

19. A storage controller, comprising:

a cache; and a processor coupled to the cache, wherein the processor is configurable to perform operations, the operations comprising:

receiving indications of a minimum retention time and a maximum retention time in a cache for a first plurality of tracks, wherein no indications of the minimum retention time or the maximum retention time in the cache are received for a second plurality of tracks; and demoting, by a cache management application, a track of the first plurality of tracks from the cache even if the track has not been in the cache for a time that exceeds the minimum retention time, in response to determining that there are too many tracks that have not been in the cache for the minimum retention time or that too few tracks of the first plurality of tracks are eligible for demotion from the cache, wherein a quantitative measure of the too many tracks or the too few tracks are provided by values of predetermined parameters.

20. The storage controller of claim 19, the operations further comprising:

demoting a track of the second plurality of tracks from the cache, in response to determining that the track of the second plurality of tracks is a least recently used (LRU) track in the LRU list.

21. The storage controller of claim 19, wherein the minimum retention time is indicative of a preference of a host application to maintain the first plurality of tracks in the cache for at least the minimum retention time, and wherein the maximum retention time is indicative of a preference of the host application to maintain the first plurality of tracks in the cache for no more than the maximum retention time.

22. The storage controller of claim 21, wherein the cache management application performs a least recently used (LRU) based replacement of tracks in the cache, and wherein the cache management application performs an attempt to satisfy the preference of the host application to maintain the first plurality of tracks in the cache for at least the minimum retention time while performing the LRU based replacement of tracks in the cache.

23. The storage controller of claim 22, wherein the cache management application retains the first plurality of tracks in the cache for no more than the maximum retention time while performing the LRU based replacement of tracks in the cache.

24. The storage controller of claim 19, the operations further comprising:
    demoting, by the cache management application, the track of the first plurality of tracks from the cache, in response to determining that the track is a least recently used (LRU) track in a LRU list of tracks in the cache and the track has been in the cache for a time that exceeds the minimum retention time; and
    demoting, by the cache management application, the track of the first plurality of tracks, in response to determining that the track has been in the cache for a time that exceeds the maximum retention time.

* * * * *